United States Patent
Ding et al.

(10) Patent No.: US 9,823,789 B2
(45) Date of Patent: Nov. 21, 2017

(54) TOUCH DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Haisheng Wang, Beijing (CN); Yingming Liu, Beijing (CN); Tao Ren, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 105 days.

(21) Appl. No.: 14/440,690

(22) PCT Filed: Aug. 16, 2014

(86) PCT No.: PCT/CN2014/084575
§ 371 (c)(1),
(2) Date: May 5, 2015

(87) PCT Pub. No.: WO2015/158083
PCT Pub. Date: Oct. 22, 2015

(65) Prior Publication Data
US 2016/0098113 A1 Apr. 7, 2016

(30) Foreign Application Priority Data
Apr. 18, 2014 (CN) .......................... 2014 1 0157705

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01); *G06F 2203/04112* (2013.01)

(58) Field of Classification Search
CPC .................. G06F 3/0416; G06F 3/044; G06F 2203/04103; G06F 2203/04107;
(Continued)

(56) References Cited

U.S. PATENT DOCUMENTS 9,529,484 B2* 12/2016 Yang ....................... G06F 3/044
2010/0295818 A1 11/2010 Lin et al.
(Continued)

FOREIGN PATENT DOCUMENTS

CN 101847071 A 9/2010
CN 101923419 A 12/2010
(Continued)

OTHER PUBLICATIONS

English Translation of Chinesew Publication No. CN 101847071 A, Sep. 29, 2010, 9 pages.*
(Continued)

*Primary Examiner* — Joe H Cheng
(74) *Attorney, Agent, or Firm* — Collard & Roe, P.C.

(57) ABSTRACT

A touch panel and a display device are disclosed. The touch panel comprises: a plurality of self-capacitance electrodes (04) disposed in a same layer and independent from each other; a plurality of wires (05) connecting the self-capacitance electrodes (04) to a margin frame of the touch panel; and periphery wirings (07) located at the margin frame of the touch panel and connected with the wires (05) one to one.
(Continued)

Each of the wires (05) is electrically connected with at least two self-capacitance electrodes that are provided non-adjacent to each other (04) and self-capacitance electrodes (04) electrically connected with different wires (05) do not overlap each other. The touch panel can reduce touch dead zone in the touch panel utilizing self-capacitance principle.

20 Claims, 9 Drawing Sheets

(58) Field of Classification Search
CPC .. G06F 2203/04111; G06F 2203/04112; G02F 1/13338; G02F 1/134309; G02F 2001/134354
See application file for complete search history.

(56) References Cited

U.S. PATENT DOCUMENTS

| | | | |
|---|---|---|---|
| 2011/0031491 A1* | 2/2011 | Yamazaki | G02F 1/136227 257/43 |
| 2011/0069036 A1* | 3/2011 | Anno | G06F 3/03545 345/174 |
| 2011/0102692 A1 | 5/2011 | Shih et al. | |
| 2012/0146942 A1 | 6/2012 | Kamoshida et al. | |
| 2012/0280238 A1* | 11/2012 | Kimura | H01L 27/1225 257/59 |
| 2012/0319974 A1* | 12/2012 | Kim | G06F 3/044 345/173 |
| 2013/0162595 A1* | 6/2013 | Lee | G06F 3/0418 345/174 |
| 2013/0314371 A1* | 11/2013 | Lee | G06F 3/0412 345/174 |
| 2013/0342479 A1* | 12/2013 | Pyo | G09G 3/00 345/173 |
| 2014/0118283 A1* | 5/2014 | Wang | G06F 3/0412 345/173 |
| 2014/0145182 A1* | 5/2014 | Yamazaki | H01L 27/124 257/43 |
| 2014/0152579 A1* | 6/2014 | Frey | G06F 3/044 345/173 |
| 2014/0168154 A1* | 6/2014 | Wang | G06F 3/0412 345/174 |
| 2015/0160754 A1* | 6/2015 | Wenzel | G06F 3/044 345/174 |
| 2015/0378474 A1* | 12/2015 | Liu | G06F 3/0412 345/174 |
| 2016/0018922 A1* | 1/2016 | Wang | G06F 3/0412 345/174 |
| 2016/0252995 A1* | 9/2016 | Wang | G06F 3/0412 |
| 2016/0259443 A1* | 9/2016 | Yang | G06F 3/044 |
| 2016/0266675 A1* | 9/2016 | Yang | G06F 3/0412 |
| 2016/0266677 A1* | 9/2016 | Liu | G06F 3/044 |
| 2016/0282976 A1* | 9/2016 | Yang | G06F 3/044 |

FOREIGN PATENT DOCUMENTS

| | | |
|---|---|---|
| CN | 102707356 A | 10/2012 |
| CN | 202939388 U | 5/2013 |
| CN | 103353819 A | 10/2013 |
| CN | 203311397 U | 11/2013 |
| CN | 103793120 A | 5/2014 |
| CN | 103885660 A | 6/2014 |
| CN | 103970392 A | 8/2014 |
| CN | 104020905 A | 9/2014 |
| CN | 104020907 A | 9/2014 |
| JP | 2013-117816 A | 6/2013 |

OTHER PUBLICATIONS

English Translation of Chinesew Publication No. CN 202939388 U, May 15, 2013, 7 pages.*
English Translation of Chinesew Publication No. CN 203311397 U, Nov. 27, 2013, 10 pages.*
International Search Report of PCT/CN2014/084575 in Chinese with English translation, dated Jan. 21, 2015.
Notice of Transmittal of the International Search Report of PCT/CN2014/084575 in Chinese, dated Jan. 21, 2015.
Written Opinion of the International Searching Authority of PCT/CN2014/084575 in Chinese with English translation, dated Jan. 21, 2015.
Chinese Office Action in Chinese Application No. 201410157705.4 dated May 23, 2016 with English translation.
Second Chinese Office Action in Chinese Application No. 201410157705.4 dated Aug. 4, 2016 with English translation.
Third Chinese Office Action in Chinese Application No. 201410157705.4 dated Oct. 27, 2016 with English translation.

* cited by examiner

TOUCH DISPLAY PANEL AND DISPLAY DEVICE

CROSS REFERENCE TO RELATED APPLICATIONS

This application is the National Stage of PCT/CN2014/084575 filed on Aug. 16, 2014, which claims priority under 35 U.S.C. §119 of Chinese Application No. 201410157705.4 filed on Apr. 18, 2014, the disclosure of which is incorporated by reference.

TECHNICAL FIELD

At least one embodiment of the present invention relates to a touch display panel and a display device.

BACKGROUND

With the fast development of display technology, touch display panels have gradually become popular in people's life. At present, according to constitution structure, touch screens may be classified into add-on mode touch panels, on-cell touch panels and in-cell touch panels. For an add-on mode touch panel, the touch panel and the liquid crystal display (LCD) are produced separately and then attached together to form a liquid crystal display with touch function. Add-on mode touch panels suffer disadvantages such as high manufacturing cost, low light transmission rate and a big assembly thickness. For an in-cell touch panel, touch electrodes of the touch panel are embedded inside the liquid crystal display, which can reduce the overall thickness of the assembly, and can drastically reduce manufacturing cost of the touch panel. Therefore, in-cell touch panels have received more attention from panel manufacturers.

At present, an in-cell touch panel detects the touch position of a finger in accordance with the mutual capacitance or self-capacitance principle. For the self-capacitance principle, it is possible to provide a plurality of self-capacitance electrodes that are disposed in the same layer and insulated from each other in the touch panel. When a human body does not touch the screen, each self-capacitance electrode experiences a capacitance of fixed value. When the human body touches the screen, corresponding self-capacitance electrodes experience capacitance that is the fixed value plus the body capacitance. The touch sensing chip can determine the touch position by detecting capacitance value variation of self-capacitance electrodes in the touch period. Since the body capacitance can act on all the self-capacitances, as compared to the fact that the body capacity can only act on projection capacitance in mutual capacitance principle, the touch variation caused by the body touching the screen is greater than that of the touch panel manufactured in mutual capacitance principle. Therefore, as compared to touch panels utilizing the mutual capacitance principle, touch panels utilizing self-capacitance principle can effectively increase signal-to-noise ratio of the touch and thereby improve accuracy of touch sensing.

While designing a touch panel in the self-capacitance principle, each self-capacitance electrode is connected with the touch sensing chip via a separate lead-out wire. As shown in FIG. 1, for example, each lead-out wire comprises: a wire 2 for connecting a self-capacitance electrode 1 to the margin frame of the touch panel, and a periphery wiring 4 disposed in margin frame for connecting the self-capacitance electrode 1 to a connecting terminal 3 of a touch sensing chip.

SUMMARY

At least one embodiment of the present invention provides a touch panel and a display device to reduce touch dead zone of touch panels utilizing self-capacitance principle.

At least one embodiment of the present invention provides a touch panel comprising: a plurality of self-capacitance electrodes disposed in a same layer and independent from each other; a plurality of wires connecting the self-capacitance electrodes to a margin frame of the touch panel, wherein each of the wires is electrically connected with at least two self-capacitance electrodes that are provided non-adjacent to each other and self-capacitance electrodes electrically connected with different wires do not overlap with each other; and periphery wirings located at the margin frame of the touch panel and connected with the wires in a one-to-one manner.

At least one embodiment of the present invention provides a display device comprising the above-mentioned touch panel.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Thicknesses and shapes of layers in the accompanying drawings do not reflect real scale, and only serve to illustrate contents of the present invention.

Figure 1:
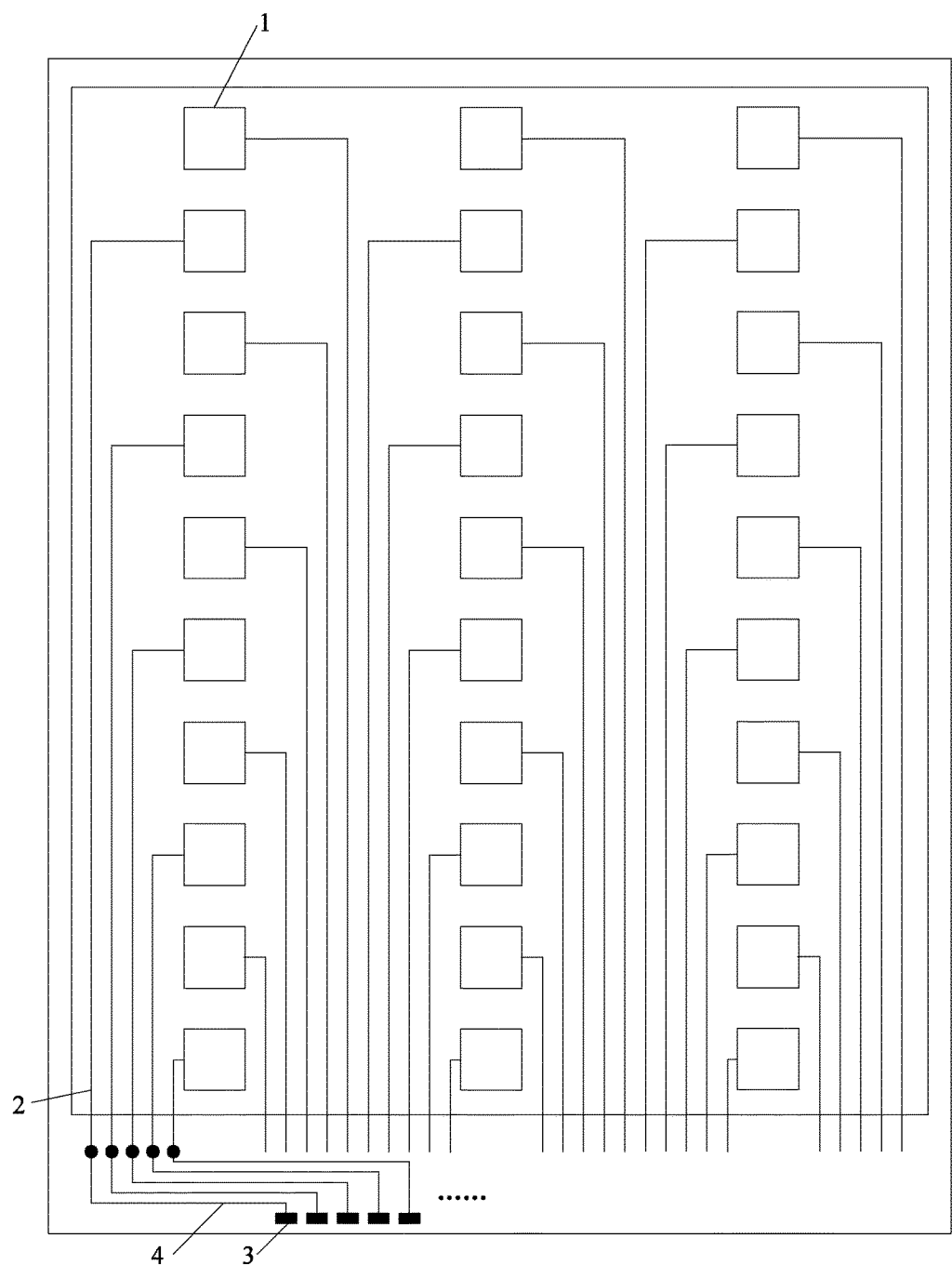
FIG. 1 is a topview structural representation of a self-capacitance electrode in a touch panel.

The inventors of the present application have noted that in the case as shown in FIG. 1, since there are many self-capacitance electrodes, there will also be many corresponding lead-out wires. Considering an example in which each self-capacitance electrode occupies an area of 5 mm*5 mm, a 5-inch liquid crystal display needs 264 self-capacitance electrodes. If each self-capacitance electrode is designed smaller, there will be more self-capacitance electrodes, and more lead-out wires need to be provided. Because wires and self-capacitance electrodes in lead-out wires are generally disposed in the same layer in design to reduce the number of layers, more wires will produce a larger touch dead zone. The touch dead zone refers to a region in a touch panel, where wirings are concentrated and signals are relatively disordered, which means that touch performance can not be guaranteed in this area. FIG. 1 is for explanation by taking 30 self-capacitance electrodes as an example. 30 self-capacitance electrodes need 30 wires for leading them out to the margin frame. 10 wires are needed for the place of densest wires, which can result in a large touch dead zone. In addition, many wires entail many periphery wirings connected one by one with wires disposed in the margin frame, which enlarges the margin frame of touch panel and is adverse to the narrow margin frame design.

Figure 3:
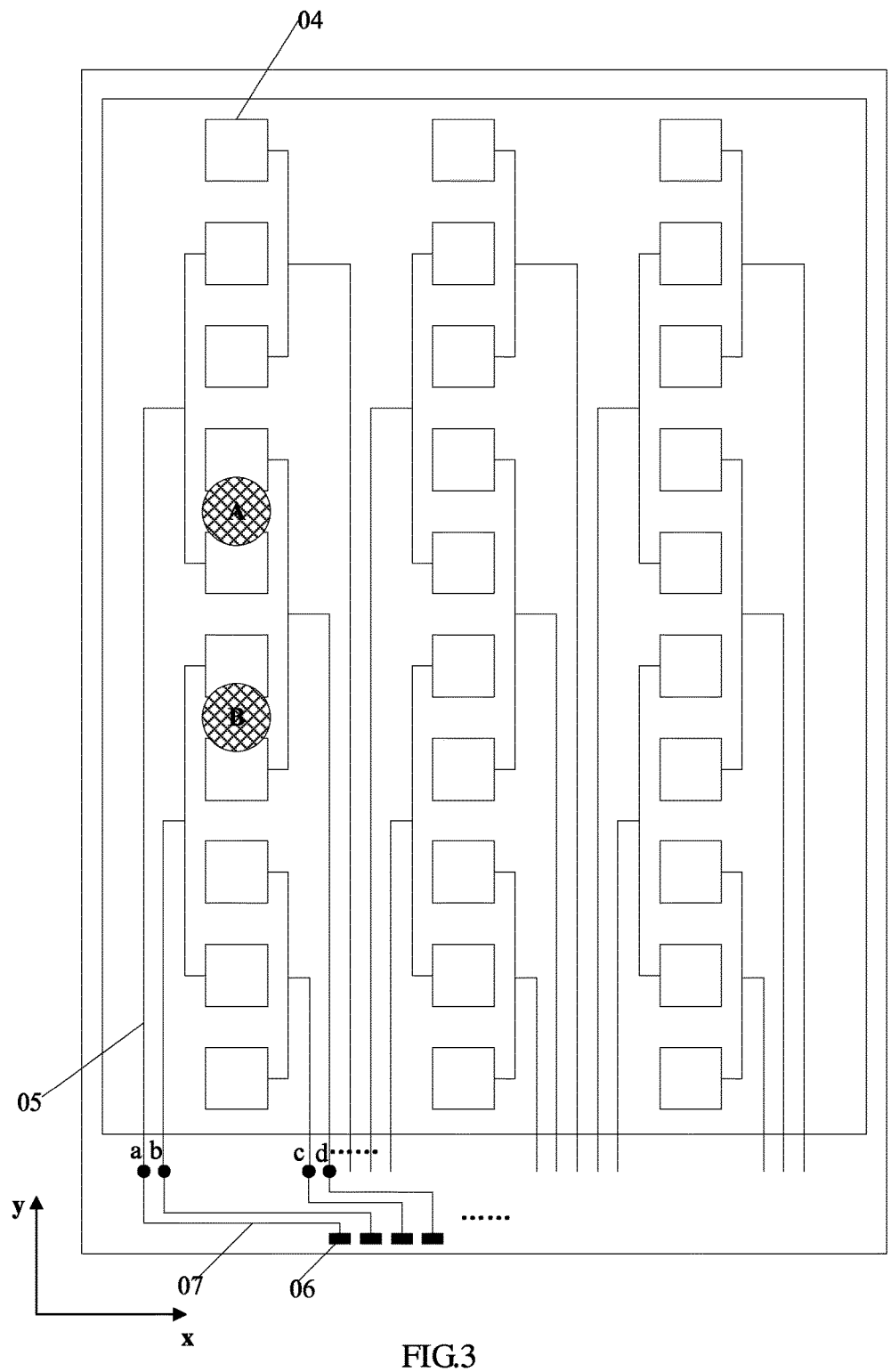
FIG. 3 is a topview structural representation of a touch panel provided in an embodiment of the present invention.
Figure 4:
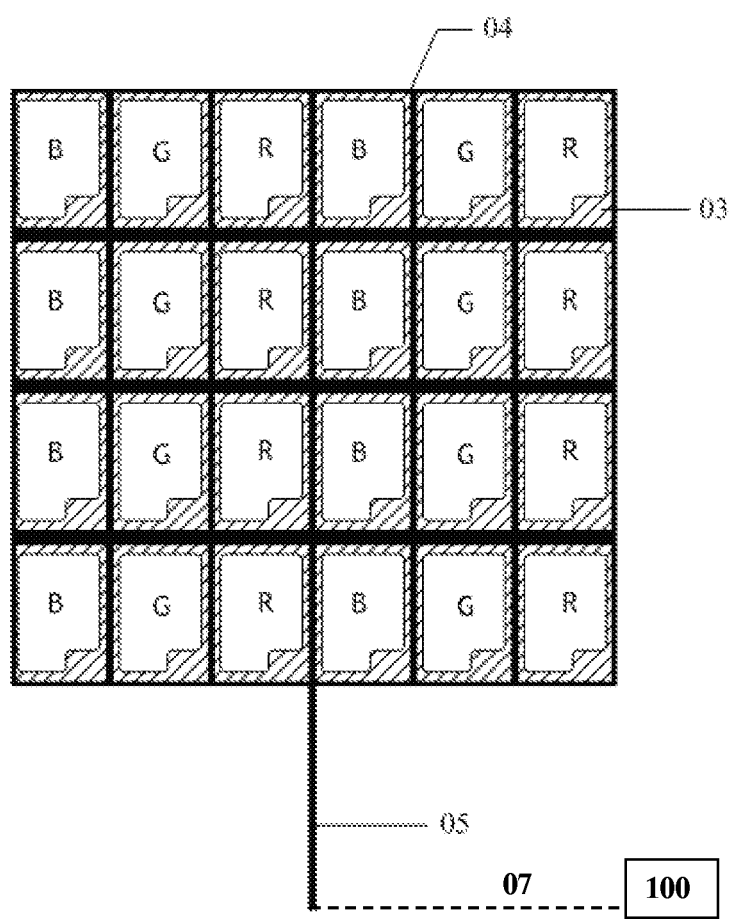
FIG. 4 is a structural representation of one self-capacitance electrode in the touch panel provided in an embodiment of the present invention.

At least one embodiment of the present invention provides a touch panel, as shown in FIG. 3, comprising: a plurality of self-capacitance electrodes 04 disposed in the same layer and mutually independent; a plurality of wires 05 connecting self-capacitance electrodes 04 to the margin frame of the touch panel; and periphery wirings 07 disposed in the margin frame of the touch panel and connect with wires 05 one by one. In one embodiment, the touch panel further comprises: a touch sensing chip for determining a touch position by detecting capacitance variation of the self-capacitance electrodes 04 in a touch period and electrically connected with periphery wirings 07 via connection terminals 06. As shown in FIG. 3, each wire 05 is electrically connected with at least two self-capacitance electrodes 04 that are disposed non-adjacent to each other, and self-capacitance electrodes 04 electrically connected with different wires 05 do not overlap each other. FIG. 3 shows an example in which every two self-capacitance electrodes are connected with one wire 05. As shown in FIG. 4, the wire 05 connects the self-capacitance electrodes 04 to the touch sensing chip 100 via a periphery wiring 07. The touch sensing chip 100 may be, for example, provided on a substrate or a flexible printed circuit board.

Figure 2:
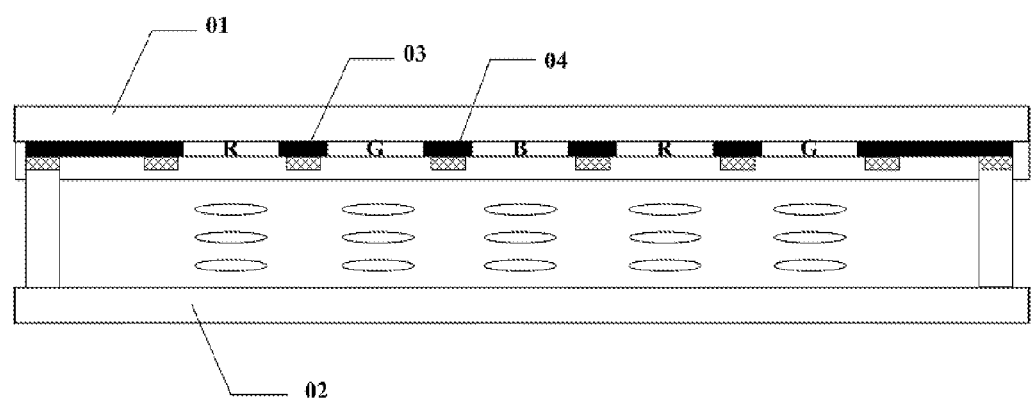
FIG. 2 is a side structural representation I of a touch panel provided in an embodiment of the present invention.

The above-mentioned touch panel provided in an embodiment of the present invention may be applied to add-on mode touch panels or in-cell touch panels. When applied to an in-cell touch panel, in one embodiment, as shown in FIG. 2, the touch panel may further comprise a top substrate 01 and a bottom substrate 02 disposed opposite to each other; and self-capacitance electrodes 04 that may be disposed on a side of the top substrate 01 facing the bottom substrate 02 or on a side of the bottom substrate 02 facing the top substrate 01. FIG. 2 shows an example in which both the black matrix layer 03 and the self-capacitance electrodes 04 are disposed on a side of the top substrate 01 facing the bottom substrate 02. Of course, in another embodiment, it is also possible to dispose the black matrix layer 03 and the self-capacitance electrodes 04 on the bottom substrate 02, which will not be described any more here.

In the above-mentioned touch panel provided in embodiments of the present invention, at least two self-capacitance electrodes 04 that are provided non-adjacent to each other are connected to the margin frame of the touch panel via a wire 05 and then connected to the touch sensing chip via a corresponding periphery wiring 07 for touch position detection. Connecting a plurality of self-capacitance electrodes 04 that are not adjacent to each other to one wire 05 can effectively reduce the overall number of wires 05 in the touch panel, thereby reducing the area occupied by a touch dead zone and guaranteeing touch performance. Furthermore, the number of corresponding periphery wirings 07 decreases along with the decrease of the number of wires 05, which is also advantageous for the design of a narrow margin frame of the touch panel.

Furthermore, since a plurality of self-capacitance electrodes 04 that are provided non-adjacent to each other are connected via one wire 05, and adjacent self-capacitance electrodes 04 are connected to the margin frame via different wires 05, when a human body touches the screen, the touch sensing chip can determine touch position by determining capacitance variation of adjacent self-capacitance electrodes 04 connected with different wires 05, which can avoid misjudgment and improve accuracy of touch sensing. Taking the connection of self-capacitance electrodes as shown in FIG. 3 as an example, since self-capacitance electrodes 04 in x direction are not connected through the same one wire 05, it is possible to accurately determine the position in x direction. Self-capacitance electrodes 04 in y direction are connected to each other in the configuration of two by two, and therefore the position in y direction needs to be determined through the signal change on different wires 05. For example, when a finger touches position A, it is known from signal change on the wire d that both positions A and B may be touched. However, from the fact that the signal on the wire a changes while the signal on the wire b does not changes, it may be known that only position A is really touched.

In one embodiment, as shown in FIG. 2, the above-mentioned touch panel provided in the embodiment of the present invention may further comprise: a black matrix layer 03 disposed on a side of the top substrate 01 facing the bottom substrate 02 or a side of the bottom substrate 02 facing the top substrate 01; the orthogonal projections of patterns of self-capacitance electrodes 04 and patterns of wires 05 onto the bottom substrate 02 are within the region correspondingly occupied by the pattern of black matrix layer 03.

Since both patterns of self-capacitance electrodes 04 and patterns of wires 05 are disposed in the region corresponding to the pattern of black matrix layer 03, electric field generated by self-capacitance electrodes 04 will not influence electric field in the pixel opening region, and therefore will not influence the normal display. Self-capacitance electrodes 04 disposed in the region blocked by the pattern of the black matrix layer 03 may also avoid influencing transmittance of the touch panel.

The resolution for a touch panel is generally on the order of millimeter. Therefore, in one embodiment, it is possible to choose the density of and the area occupied by self-capacitance electrodes 04 according to the required touch resolution to ensure the required touch resolution. Generally, self-capacitance electrodes 04 are designed as square electrodes having the size of 5 mm*5 mm. The resolution for display screen is generally on the order of micron, and therefore one self-capacitance electrode 04 generally may correspond to a plurality of pixel units in the display screen. In order to ensure that the patterns of self-capacitance electrodes 04 do not occupy opening areas for pixel units, as shown in FIG. 4, in one embodiment, it is possible to cut out patterns at positions corresponding to the opening areas of pixel units (i.e., forming blank parts in pixel regions) within the patterns of self-capacitance electrodes 04, that is, patterns of self-capacitance electrodes 04 can designed such that their orthogonal projections on the bottom substrate 02 are of a mesh structure in regions where the pattern of black matrix layer 03 is located. Furthermore, in order to ensure display uniformity, patterns of self-capacitance electrodes 04 are generally disposed in gaps between sub-pixel units in a pixel unit. In FIG. 4, each group of RGB sub-pixel units constitute a pixel unit. The density or resolution as referred to in embodiments of the present invention means the pitch between self-capacitance electrodes of the touch panel or the pitch between pixel units of the display screen.

In a different embodiment, wires 05 and self-capacitance electrodes 04 may be disposed on the same substrate, that is, both are disposed on the top substrate 01 or on the bottom substrate 02; and periphery wirings 07 and connection terminals 06 of the touch sensing chip may be disposed on the bottom substrate 02. For example, when wires 05 and self-capacitance electrodes 04 are disposed on the top substrate 01, wires 05 may be electrically connected with periphery wirings 07 on the bottom substrate 02 by the conduction effect of conducting particles such as gold balls in sealant. For example, when wires 05 and self-capacitance electrodes 04 are disposed on the bottom substrate 02, wires 05 may be electrically connected with periphery wirings 07 of the bottom substrate 02 directly.

In one embodiment, In order to reduce the number of layers and patterning processes in the touch panel as many as possible, it is possible to dispose wires 05 and self-capacitance electrodes 04 on the same layer. Because patterns of self-capacitance electrodes 04 and wires 05 are designed with one layer of metal, in order to avoid short circuit between self-capacitance electrodes 04, wires 05 for connecting self-capacitance electrodes 04 should not cross each other. Therefore, in this case it is possible to adopt the manner as shown in FIG. 3 in which two self-capacitance electrodes 04 that are provided non-adjacent to each other are electrically connected with one wires 05. In this way, as compared to the connection manner as shown in FIG. 1 in which self-capacitance electrodes 04 and wires 05 are connected in a one-to-one manner, the number of wires 05 may be reduced by a half, which drastically reduces the area of touch dead zone.

In one embodiment, in designing extension directions of wires 05, it is possible to design the extension directions of all wires 05 to be identical. Generally, the margin frame of a touch panel is of a rectangle shape. In one embodiment, in order to reduce the area of a touch dead zone, it is possible to configure the extension direction of wires 05 to be consistent with the direction of the short side of the margin frame of the touch panel so as to reduce the area of the touch dead zone by shortening the length of wires 05 connecting the self-capacitance electrodes 04 as much as possible.

In one embodiment, in order to reduce the area of the touch dead zone as much as possible, the margin frame of the touch panel generally have four sides and it is possible to connect self-capacitance electrodes 04 to the closest side via corresponding wires 05 as well as ensure wires 05 do not cross each other. This can shorten the length of wires 05 connecting self-capacitance electrodes 04 as much as possible, and reduce the area of the touch dead zone as much as possible as a whole.

Figure 5:
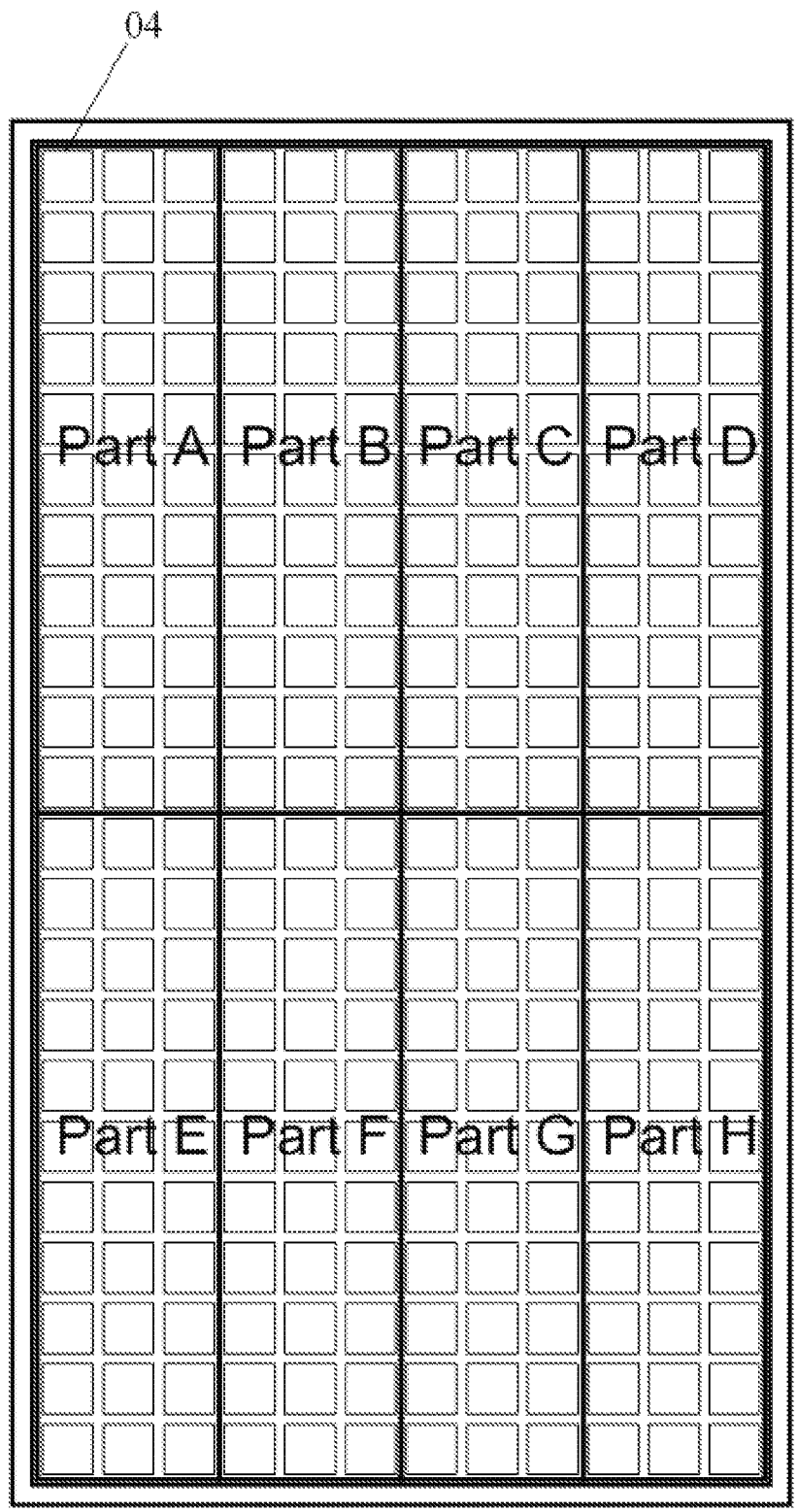
FIG. 5 is a diagram of self-capacitance electrode partitions in a display area of the touch panel provided in an embodiment of the present invention.
Figure 6:
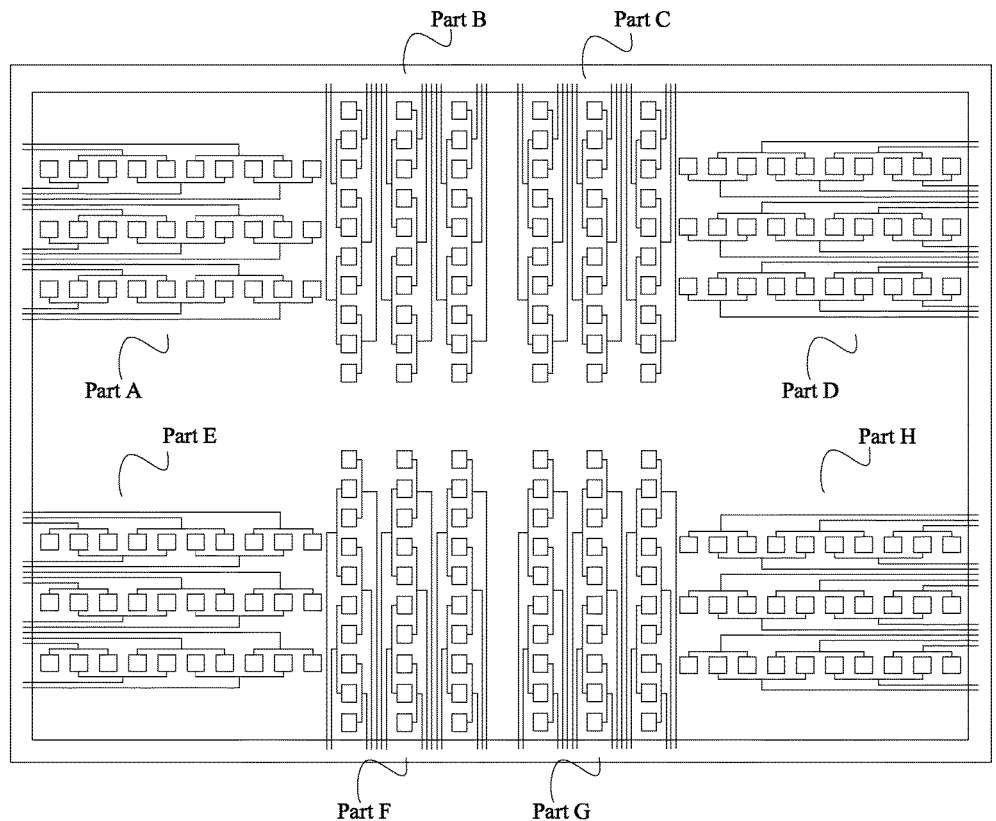
FIG. 6 is a connection diagram of connecting self-capacitance electrodes disposed in the same layer to a margin frame in areas of the touch panel provided in an embodiment of the present invention.

The above-mentioned design for reducing a touch dead zone provided in the embodiment of the present invention will be described with respect to a 5-inch touch panel as an example in which about 22*12=264 self-capacitance electrodes 04 are needed. As shown in FIG. 5, in order to lead each self-capacitance electrode 04 to the margin frame and reduce the area of touch dead zone as far as possible, it is possible to partition all self-capacitance electrodes 04 into 8 regions, namely Part A-Part H, and self-capacitance electrodes 04 in each region are connected individually to the connection terminals of the touch sensing chip under the display area (Panel). As shown in FIG. 6, the connection relationship of a portion of self-capacitance electrodes 04 is shown for each region. Self-capacitance electrodes in region, Part A, are led out from the top left region of the display area and led to the connection terminals of the touch sensing chip through the left margin frame of the display area. Self-capacitance electrodes in region, Part B, are led out from the top of the display area and then led to the connection terminals of the touch sensing chip through the left margin frame of the display area. Self-capacitance electrodes in region, Part C, are led out from the top of the display area and then led to the connection terminals of the touch sensing chip through the right margin frame of the display area. Self-capacitance electrodes in region, Part D, are led out from the top right of the display area and then led to connection terminals of the touch sensing chip through the right margin frame of the display area. Similarly, self-capacitance electrodes in region, Part E, are led out from the bottom left region of the display area and led to connection terminals of the touch sensing chip through the left margin frame of the display area. Self-capacitance electrodes in region, Part F, are led out from the bottom of display area and then directly connected to the connection terminals of the touch sensing chip. Self-capacitance electrodes in region, Part G, are led out from the bottom of display area and then directly connected to the connection terminals of the touch sensing chip. Self-capacitance electrodes in region, Part H, are led out from the lower right region of the display area and then led to the connection terminals of the touch sensing chip through the right margin frame of the display area.

In the touch panel provided in one embodiment of the present invention, as shown in FIG. 2, the black matrix layer 03 may be on a side of the top substrate 01 facing the bottom substrate 02, and a color filter layer may be further provided on the black matrix layer 03 (RGB in FIG. 2 denotes the color filter layer that may generally cover the black matrix layer). When self-capacitance electrodes 04 and wires 05 are disposed on the same layer, it is possible to dispose self-capacitance electrodes 04 and wires 05 between the black matrix layer 03 and the color filter layer, or on the color filter layer.

Figure 7:
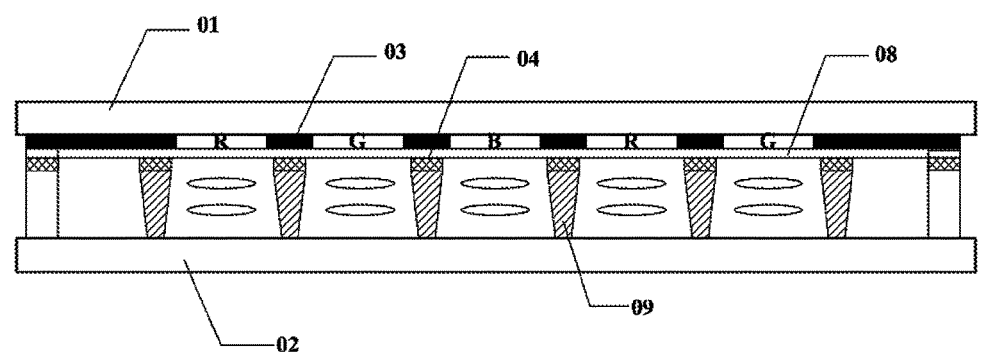
FIG. 7 is a side structural representation II of a touch panel provided in an embodiment of the present invention.

In the touch panel provided in one embodiment of the present invention, as shown in FIG. 7, a first planarization layer 08 and a spacer layer 09 over the first planarization layer 08 may be further provided in order over the black matrix layer 03 and the color filter layer. The self-capacitance electrodes 04 and wires 05 are located between the first planarization layer 08 and the spacer layer 09. This can eliminate the patterning of the first planarization layer 08, and wires 05 disposed on the same layer as self-capacitance electrodes 04 may be connected with periphery wirings 07 which are located at the bottom substrate 02 and electrically connected with the touch sensing chip directly via the margin frame sealant, and this saves the manufacturing process.

In one embodiment, in order to eliminate the touch dead zone in the touch panel, it is possible to dispose self-capacitance electrodes 04 and wires 05 in different layers and electrically connect self-capacitance electrodes 04 with corresponding wires 05 through via holes. When self-capacitance electrodes 04 and wires 05 are disposed in different layers, in order to reduce interference of body capacitance with respect to signals that are transmitted on wires, it is possible to dispose self-capacitance electrodes 04 between the black matrix layer 03 and the color filter layer and dispose wires 05 on the color filter layer. Wires 05 are connected with self-capacitance electrodes 04 through via holes in the color filter layer such that self-capacitance electrodes 04 may shield signal interference invoked by wires 05 covered by themselves.

Figure 8A:
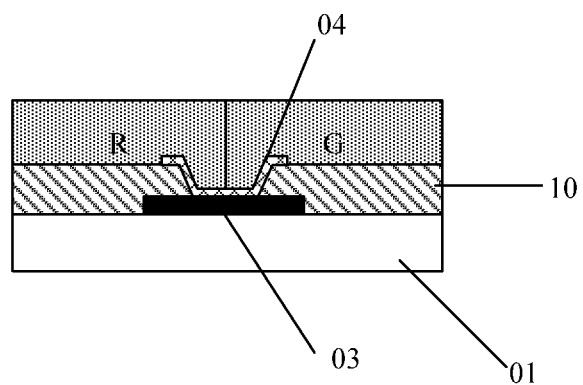
FIGS. 8a and 8b are structural representations of self-capacitance electrodes filled in through holes or channels of the second planarization layer in the touch panel provided in an embodiment of the present invention respectively.
Figure 8B:
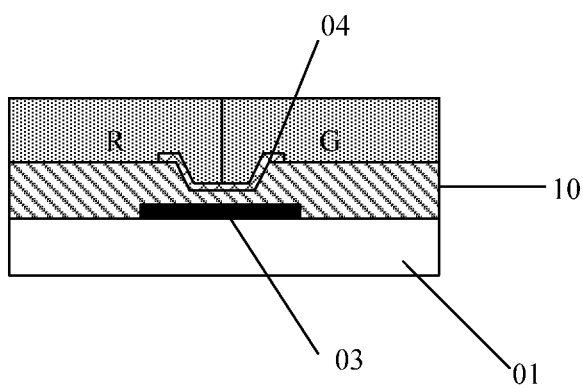

In the above-mentioned touch panel provided in the embodiment of the present invention, since patterns of self-capacitance electrodes 04 are blocked by the pattern of black matrix layer, the total area of the pattern of the mesh structure of the self-capacitance electrodes 04 is limited by the area of the pattern of a black matrix layer 03. In order to increase the area of patterns of self-capacitance electrodes 04 as much as possible so as to enhance the touch sensitivity, in at least one embodiment, as shown in FIGS. 8a and 8b, it is also possible to provide a second planarization layer 10 between the black matrix layer 03 and the color filter layer, and the second planarization layer 10 has through holes or grooves (blind holes) of for example trapezoid shape at least in regions corresponding to patterns of self-capacitance electrodes 04. FIG. 8a shows that the second planarization layer 10 has through holes of a trapezoid shape in regions corresponding to the patterns of self-capacitance electrodes 04, and FIG. 8b shows that the second planarization layer 10 has grooves of a trapezoid shape in regions corresponding to the patterns of self-capacitance electrodes 04. Patterns of self-capacitance electrodes 04 fill at least in through holes or grooves, and the surface area of self-capacitance electrodes 04 filled in through holes or grooves is greater than the trapezoid basal area of through holes or grooves. It is possible to increase the area of the patterns of self-capacitance electrodes 04 in the above-mentioned way. Furthermore, self-capacitance electrodes 04 disposed in through holes or grooves have a concave-convex structure, and the convex parts as seen from the finger side can aggregate more charges since they are tips. When a finger touches the panel, it is possible to enhance the touch variation and in turn improve the effect of touch sensing.

In the touch panel provided in the embodiment of the present invention, because the body capacitance act on the self-capacitance of self-capacitance electrodes 04 in a direct coupling mode, when a human body touches the screen, only the self-capacitance electrodes 04 directly under the touch position is subjected to significant change in their capacitance value, while self-capacitance electrodes 04 adjacent to self-capacitance electrodes 04 directly under the touch position is subjected to very slight change their capacitance value. In this way, when the human body touches an area smaller than that of one self-capacitance electrode, the touch position might not be located accurately. Therefore, in the touch panel provided in one embodiment of the present invention, it is possible to configure opposite sides of two adjacent self-capacitance electrodes 04 as fold lines such that the touch position of the human body can always cover the areas of a plurality of self-capacitance electrodes, therefore it is possible to determine the touch position in the way provided in the embodiment of the present invention.

For example, it is possible to set the overall shape of self-capacitance electrodes 04 in one of the following ways or in the combination thereof.

Figure 9A:
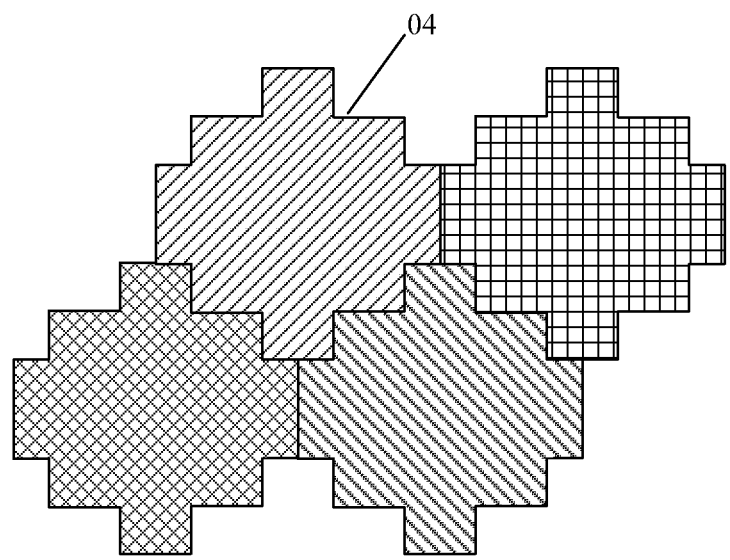
FIGS. 9a and 9b are structural representations showing adjacent self-capacitance electrodes having opposite sides configured in fold lines in the touch panel provided in an embodiment of the present invention respectively.

(1) The opposite sides of two adjacent self-capacitance electrodes 04 that are fold lines may be configured as step-like structures such that two opposite step-like structures have consistent and matching structural shapes as shown in FIG. 9a. FIG. 9a shows 2*2 self-capacitance electrodes 04.

Figure 9B:
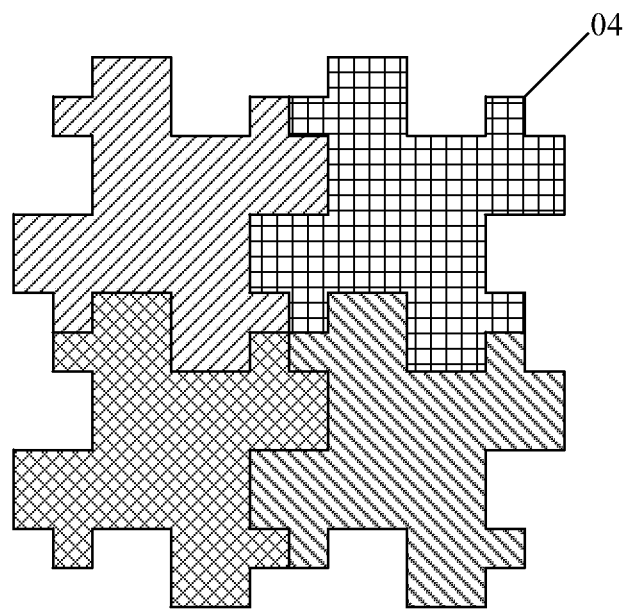

(2) The opposite sides of two adjacent self-capacitance electrodes 04 that are fold lines may be configured as concave-convex structures such that two opposite concave-convex structures have consistent and matching structural shapes as shown in FIG. 9b. FIG. 9b shows 2*2 self-capacitance electrodes 04.

In one embodiment, in order to reduce mutual interference between display signals and touch signals and enhance picture quality and touch accuracy, in the above-mentioned touch panel provided in the embodiment of the present invention, time-division driving mode may be employed for touch and display phases. Also, in one embodiment, it is also possible to integrate the display driving chip and the touch sensing chip as one chip to further reduce the production costs.

Figure 10:
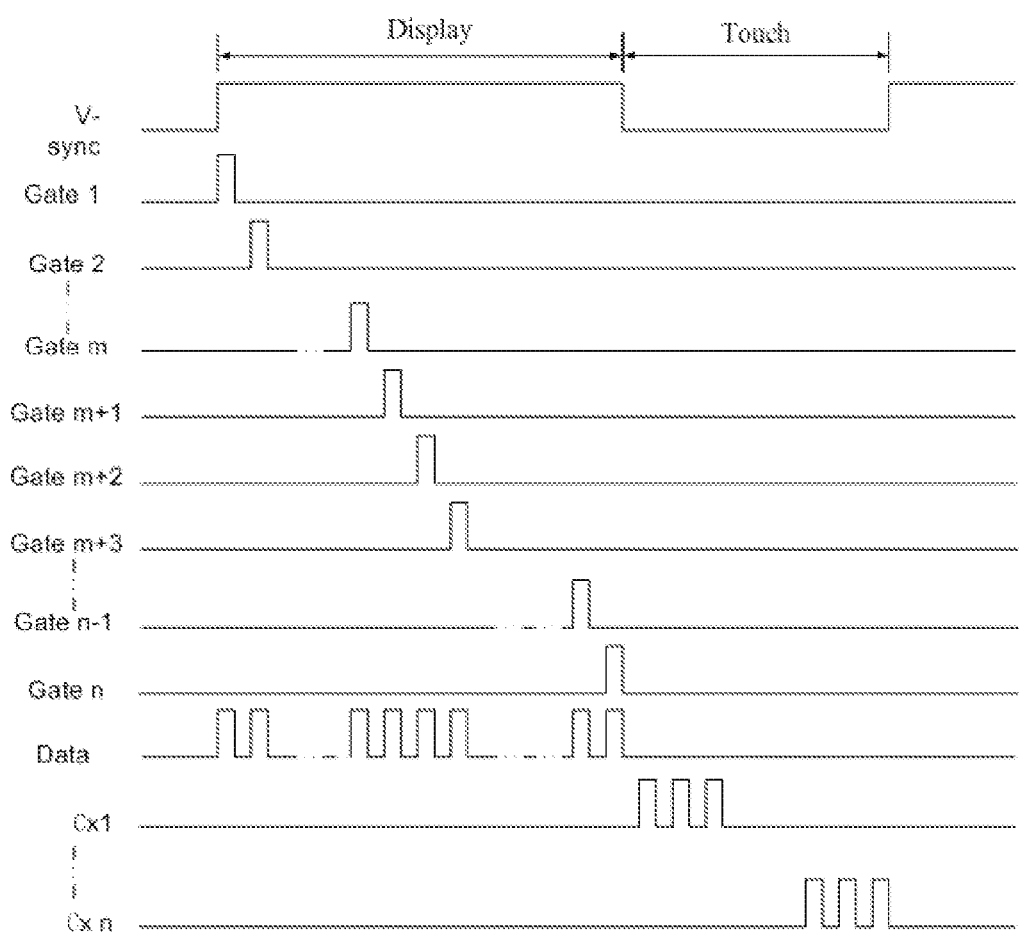
FIG. 10 is a time sequence diagram of a touch panel provided in an embodiment of the present invention.

In one embodiment, For example, in the driving timing sequence diagram shown in FIG. 10, the time period for the touch panel to display each frame (V-sync) is divided into a display interval (Display) and a touch interval (Touch). For example, in the driving timing sequence diagram as shown in FIG. 10, the time period for the touch panel to display one frame is 16.7 ms in which 5 ms is selected for the touch interval and the rest 11.7 ms for the display interval. Of course, it is also possible to appropriately adjust durations of both intervals according to processing capacity of the IC chip, which is not specifically limited in embodiments of the present invention. In the display interval (Display), gate signal lines Gate 1, Gate 2, . . . Gate n in the touch panel are applied with gate scanning signals successively and data signal lines Data is applied with gray scale signals to implement liquid crystal display function. In the touch interval (Touch), the touch sensing chip connected with self-capacitance electrodes Cx1 . . . Cxn applies driving signals to touch driving electrodes Cx1 . . . Cxn respectively and receives feedback signals from self-capacitance electrodes Cx1 . . . Cxn, and determine whether touch occurs by analyzing feedback signals to implement touch function.

Based on the same inventive concept, at least one embodiment of the present invention further provides a display device comprising the above-mentioned touch panel provided in embodiments of the present invention. The display device may be any product or component having display function such as a cell phone, a tablet computer, a TV set, a display, a notebook computer, a digital picture frame and a navigator. The above-mentioned embodiments of the touch panel may be referred to for implementations of the display device, and redundant descriptions will not be repeated any more.

For the touch panel and display device provided in embodiments of the present invention, self-capacitance principle is utilized to dispose a plurality of self-capacitance electrodes arranged in the same layer and independent from each other, at least two self-capacitance electrodes that are provided non-adjacent to each other are connected to the margin frame of touch panel via one wire and then connected to the touch sensing chip for touch position detection via one corresponding periphery wiring. Connecting a plurality of self-capacitance electrodes that are not adjacent to each other to one wire can effectively reduce the overall number of wires in the touch panel, thereby reducing the area of the touch dead zone and guaranteeing touch performance. Furthermore, the number of corresponding periphery wirings decreases with the decrease of the number of wires, which is also advantageous for the design of a narrow margin frame of the touch panel. Furthermore, since a plurality self-capacitance electrodes that are provided non-adjacent to each other are connected via one wire, and adjacent self-capacitance electrodes are connected to the margin frame via different wires, when a human body touches the screen, the touch sensing chip can determine the touch position by determining capacitance variation of adjacent self-capacitance electrodes connected with different wires, which can avoid misjudgment and realize accuracy of touch sensing.

It is understood that one skilled in the art can make various modifications and variations to the present invention without departing from the spirit and scope of the present invention. Thus, if these modifications and variations of the present invention fall within the scope of claims and their equivalents of the present invention, it is intended that the present invention contains these modifications and variations.

The present application claims priority of China Patent application No. 201410157705.4 filed on Apr. 18, 2014, the content of which is incorporated by reference herein in its entirety as part of the present application.

The invention claimed is:

1. A touch panel comprising:
a plurality of self-capacitance electrodes disposed in a same layer and independent from each other;
a plurality of wires connecting the self-capacitance electrodes to a margin frame of the touch panel, wherein each of the wires is electrically connected with at least two self-capacitance electrodes that are provided non-adjacent to each other and self-capacitance electrodes electrically connected with different wires do not overlap with each other;
periphery wirings located at the margin frame of the touch panel and connected with the wires in a one-to-one manner;
a touch sensing chip electrically connected with the periphery wirings via connection terminals;
a top substrate and a bottom substrate disposed oppositely to each other;
a black matrix layer disposed on a side of the top substrate facing the bottom substrate; and
a color filter layer disposed on the black matrix layer,
wherein the self-capacitance electrodes are located between the black matrix layer and the color filter layer,
wherein the plurality of self-capacitance electrodes includes a first self-capacitance electrode, a second self-capacitance electrode, a third self-capacitance electrode and a fourth self-capacitance electrode,
wherein the first self-capacitance electrode and the second self-capacitance electrode are non-adjacent to each other and are connected to a first wire, the third self-capacitance electrode is adjacent to the first self-capacitance electrode and connected to a second wire, and the fourth self-capacitance electrode is adjacent to the second self-capacitance electrode and connected to a third wire, and
wherein the touch sensing chip is configured to detect a touch on the first self-capacitance electrode by detecting signal changes on the first wire and the second wire and detecting no signal change on the third wire.

2. The touch panel of claim 1, wherein the self-capacitance electrodes are disposed on a side of the top substrate facing the bottom substrate.

3. The touch panel of claim 2, wherein the self-capacitance electrodes and the wires have orthogonal projections on the bottom substrate that are within a region corresponding to a pattern of the black matrix layer.

4. The touch panel of claim 3, wherein the orthogonal projections of the self-capacitance electrodes on the bottom substrate are of a mesh structure within the region corresponding to the pattern of the black matrix layer.

5. The touch panel of claim 3, wherein the wires are located between the black matrix layer and the color filter layer, or on the color filter layer.

6. The touch panel of claim 5, wherein a planarization layer is disposed between the black matrix layer and the color filter layer, the planarization layer has through holes or grooves at least in regions corresponding to patterns of the self-capacitance electrodes, and patterns of the self-capacitance electrodes fill in the through holes or grooves.

7. The touch panel of claim 6, wherein the through holes or grooves are of a trapezoid shape.

8. The touch panel of claim 6, wherein a surface area of the self-capacitance electrodes filled in the through holes or grooves is greater than a basal area of the through holes or grooves.

9. The touch panel of claim 2, wherein opposite sides of adjacent two self-capacitance electrodes are both fold lines.

10. The touch panel of claim 9, wherein the opposite sides of adjacent two self-capacitance electrodes that are fold lines both have step-like structures that are consistent and matching each other; and/or
the opposite sides of adjacent two self-capacitance electrodes that are fold lines both have concave-convex structures that are consistent and matching each other.

11. The touch panel of claim 1, wherein each of the wires is electrically connected with two self-capacitance electrodes that are disposed not adjacent to each other, and each of the wires is disposed in a same layer as the self-capacitance electrodes.

12. The touch panel of claim 1, wherein the margin frame of the touch panel is of a rectangle shape, and extension directions of the wires are consistent with a direction of a short side of the margin frame.

13. The touch panel of claim 1, wherein the margin frame of the touch panel has four sides, and each of the self-capacitance electrodes are connected to a closest side via a corresponding one of the wires while the wires do not intersect each other.

14. The touch panel of claim 1, wherein the wires and the self-capacitance electrodes are disposed on different layers, and the self-capacitance electrodes and corresponding wires are electrically connected through via holes.

15. The touch panel of claim 14, wherein the wires are located on the color filter layer and are electrically connected with corresponding self-capacitance electrodes through via holes in the color filter layer.

16. The touch panel of claim 1, wherein opposite sides of adjacent two self-capacitance electrodes are both fold lines.

17. The touch panel of claim 16, wherein the opposite sides of adjacent two self-capacitance electrodes that are fold lines both have step-like structures that are consistent and matching each other; and/or the opposite sides of adjacent two self-capacitance electrodes that are fold lines both have concave-convex structures that are consistent and matching each other.

18. A display device comprising the touch panel of claim 1.

19. A touch panel comprising:
a plurality of self-capacitance electrodes disposed in a same layer and independent from each other;
a plurality of wires connecting the self-capacitance electrodes to a margin frame of the touch panel, wherein each of the wires is electrically connected with at least two self-capacitance electrodes that are provided non-adjacent to each other and self-capacitance electrodes electrically connected with different wires do not overlap with each other;
periphery wirings located at the margin frame of the touch panel and connected with the wires in a one-to-one manner; and
a touch sensing chip electrically connected with the periphery wirings via connection terminals,
wherein the plurality of self-capacitance electrodes includes a first self-capacitance electrode, a second self-capacitance electrode, a third self-capacitance electrode and a fourth self-capacitance electrode,
wherein the first self-capacitance electrode and the second self-capacitance electrode are non-adjacent to each other and are connected to a first wire, the third self-capacitance electrode is adjacent to the first self-capacitance electrode and connected to a second wire, and the fourth self-capacitance electrode is adjacent to the second self-capacitance electrode and connected to a third wire, and
wherein the touch sensing chip is configured to detect a touch on the first self-capacitance electrode by detecting signal changes on the first wire and the second wire and detecting no signal change on the third wire.

20. The touch panel of claim 19, further comprising:
a top substrate and a bottom substrate disposed oppositely to each other; and
a black matrix layer disposed on a side of the top substrate facing the bottom substrate,
wherein the self-capacitance electrodes are disposed on a side of the top substrate facing the bottom substrate, and the self-capacitance electrodes and the wires have orthogonal projections on the bottom substrate that are within a region corresponding to a pattern of the black matrix layer.

* * * * *